Dec. 14, 1943.  G. A. VAIPAN  2,336,972
LEVER ACTION TABLE SAW SET DEVICE
Filed July 8, 1942    2 Sheets-Sheet 1
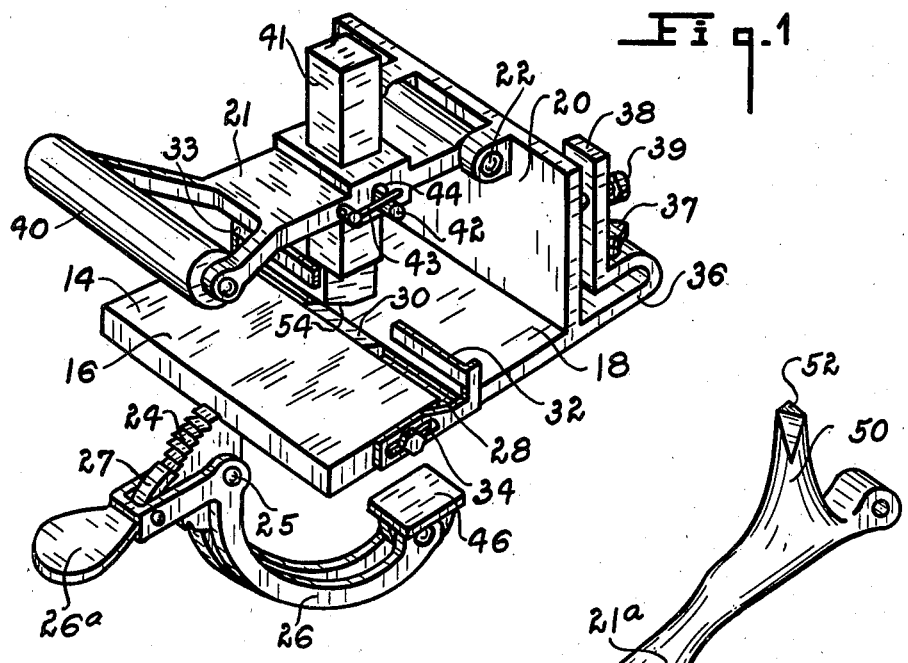
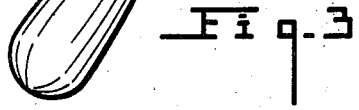
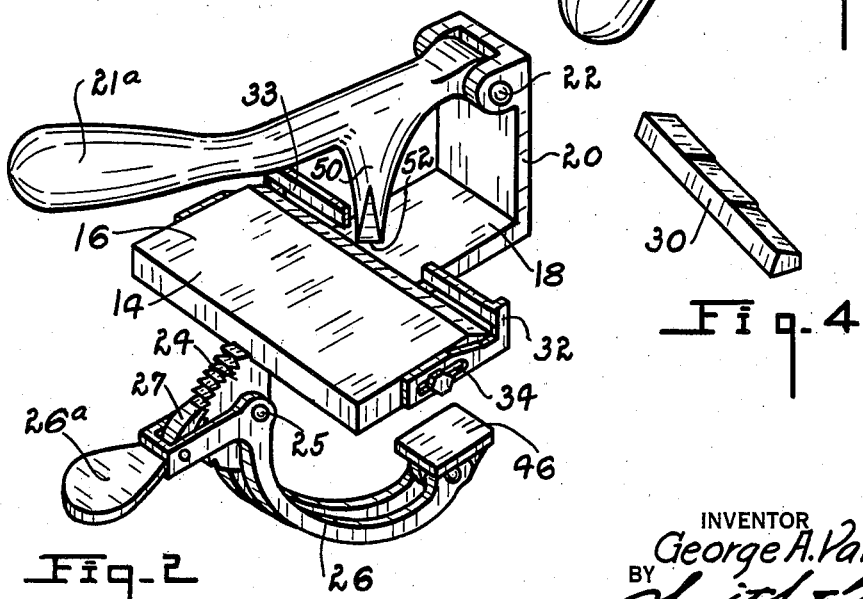

Dec. 14, 1943.  G. A. VAIPAN  2,336,972
LEVER ACTION TABLE SAW SET DEVICE
Filed July 8, 1942  2 Sheets-Sheet 2
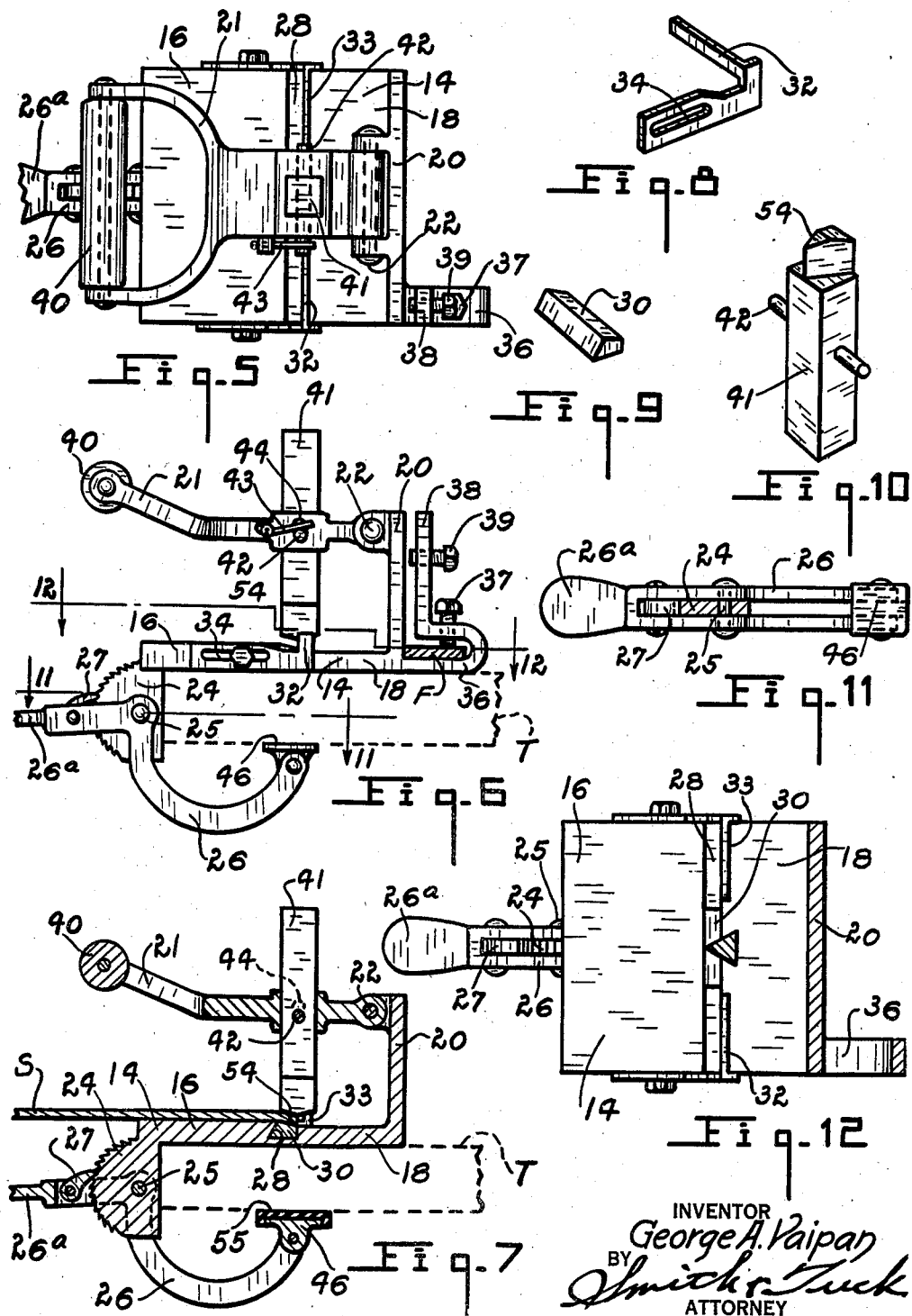
INVENTOR
George A. Vaipan
BY Smith & Tuck
ATTORNEY Patented Dec. 14, 1943

2,336,972

UNITED STATES PATENT OFFICE 2,336,972

LEVER ACTION TABLE SAW SET DEVICE

George A. Vaipan, Tyonek, Territory of Alaska

Application July 8, 1942, Serial No. 450,210

3 Claims. (Cl. 76—63)

My present invention relates to the art of saw setting and jointing devices and more particularly to lever action table saw set devices.

In my present invetnion I have provided means whereby an inexperienced person can with facility and certainty, accurately set a saw so that each tooth will be set in the proper amount and sense and I have further constructed my device so that it may be readily moved about and clamped in place on any convenient firm support.

The principal object of my present invention is to provide means whereby the teeth of a saw may be uniformly set by a gradually applied pressure as distinguished from the sharp blow of a hammer so often used. To facilitate this operation I have provided that the setting member proper is formed as part of, or secured to, a lever which is pivoted at a considerable distance from the point of pressure application, so that as pressure is applied there is a sliding movement which tends to move the metal of the tooth into a gradual curve as distinguished from a sharp angular displacement.

Another object of my invention is to provide a saw setting device having a pivotally mounted setting plunger, movable in an arcuate path while in contact with the saw tooth so that it will have a slight drawing or sliding movement relative to the saw tooth as it is being pressed down on the saw tooth whereby the danger of breaking the tooth will be eliminated.

Another important object of my invention is to provide a novel clamping arrangement for saws having small teeth, said clamping means being arranged to position the saw accurately while the teeth are being set, said clamp consisting of an adjustable gauge member.

Still another object of my present invention is to provide a novel clamping means whereby my saw setting device may be very quickly clamped to, or removed from, its support.

A further object is to provide means for holding a jointing file in position so that the saw may be passed over the same instead of the file being passed over the saw. This admits of much quicker and perfect jointing and at the same time provides that the normal saw handles are used to assist the workman in this operation.

A still further object of my invention is to provide additional to my saw setting and jointing means, a clamp arrangement which will hold a saw securely in place while filing is being done; thus making available in a single device all the means necessary to properly condition a saw for use.

Other and more specific objects will be apparent from the following description taken in connection with the accompanying drawings, wherein Figure 1 is a perspective view showing one form of my saw setting device.

Figure 2 is a perspective view showing a simplified form of my saw setting device.

Figure 3 is a perspective view showing the lever of the device of Figure 2 in its inverted position.

Figure 4 illustrates in perspective the anvil used in my saw setting device.

Figure 5 is a top plan view of the device of Figure 1.

Figure 6 is an end elevation of the device of Figure 1 with the supporting table shown in dashed line.

Figure 7 is an elevation partly in section to more fully illustrate certain parts of my saw setting device.

Figure 8 is a perspective view showing one of my gauge bars.

Figure 9 illustrates one form of anvil used with my device.

Figure 10 illustrates the setting plunger of my device in an inverted position.

Figure 11 is a cross-sectional view in plan taken along the line 11—11 of Figure 6.

Figure 12 is a cross sectional view in plan taken along the line 12—12 of Figure 6.

Referring to the drawings, throughout which like reference characters indicate like parts, 14 generally designates the base of my saw setting device. This is provided with a saw rest portion 16 and a rearwardly extending portion 18 which terminates in an upwardly extending bracket portion 20, having, in turn, pivotally secured to it the setting lever 21. A pivot for lever 21, or 21a as indicated in Figure 2, is provided by pin 22 which is passed through suitable lugs formed as part of bracket 20. The setting levers are provided with a downwardly directed bar terminating in a point for engagement with the saw teeth. The forward or rest portion 16 of base 14 is provided with a downwardly extending ratchet member 24 which is formed as part of base 14 and in turn provides for pivot pin 25 about which the slotted clamp arm 26 is positioned to revolve. The clamp member 26 is held in adjusted position by pawl member 27.

Referring more particularly to the showings of Figures 1, 5, 6 and 7, base 14 is provided normally with an under cut groove at 28 into which is slidably placed anvil member 30. This member is made after the showing of Figures 4 and 9 and preferably provides for a plurality of beveled faces disposed to form different angles with respect to rest portion 16, of the base, and in this manner varying sets may be given to the saw; it being understood it is believed that a wide variety of members 30 might be used having angles so formed as to provide any desirable bevel for creating the set desired in the saw.

As a gauge to provide definite placement of the saw on plate 16 I provide the coacting gauge members 32 and 33. These are preferably secured to base 14 as with a sliding arrangement indicated at 34, so that they can be adjustably positioned to place the saw teeth at the point desired and are preferably formed as shown in Figures 1 and 2, so that they form a retaining means for anvil member 30.

The rear portion of base 14 is formed with an outwardly extending clamp portion 36 which is provided with a clamp screw 37 so that a file F may be clamped in a horizontal position in this member for purposes of jointing the teeth of a saw. Formed preferably as part of clamp member 36 is an upwardly extending portion 38 disposed parallel to bracket 20. This portion is provided with a lock screw 39 so that a saw may be clamped by this means against bracket 20 and held in suitable position for filing.

Lever 21 as shown in Figure 1 is provided at its outer end with some suitable handle as 40 and intermediate it is provided with a setting plunger 41. This plunger should have a cross-section that will prevent its turning in handle 21. In Figure 1, I have illustrated this as square although any shape other than round would be satisfactory.

For use with certain types of saws, I have further provided that plunger 41 be retained substantially in its fixed position by a through pin 42 and to provide that the plunger will normally be in its downward position, I have provided a tortion spring at 43 to keep pin 42 in the lowermost part of slot 44. This permits the operator to strike plunger 41 with a hammer in the rare instances when the steady pressure may not be sufficient to set the tooth.

It is believed that it will be understood, particularly from Figures 6 and 7, the manner in which my saw setting device is clamped to a table as T. It is desired to point out, however, that due to the varying thicknesses of work benches and the like, it has been found very desirable to provide a pivoted foot at 46 so that no matter how thick the table T may be, foot 46 will always come to a definite bearing and thus hold my device securely in position. To further assist in securely positioning my device it has been found desirable to curve the bar of clamp 26 so that in event a very thick table is used the curve will properly clear the lower corner of the table.

In Figure 2, I have illustrated a simplified form of my device. This is done to the end of providing a cheaper tool, one that will serve to a degree the same function as my more complicated device, but which lends itself readily to commercial casting and can be made with the minimum of expensive machinery. Essentially, the base and the guide, or gauge, bars are similar to that shown in Figure 1 and the anvil 30 might be dispensed with as the device will set any saw tooth for depth by moving the saw gauge members 32 and 33 in for small teeth and out for large teeth.

The clamping means is identical with the other mechanism which is as simple a means as can be relied upon to securely hold the device in position with the minimum waste of the operator's time. Lever 21ᵃ is normally formed as a casting or forging and has formed on the downwardly extending portion 50 the setting faces at 52. This exact construction is probably best illustrated in Figure 3 where lever 21ᵃ is shown in its inverted position; it will be noted that the surface engaging the tooth is triangular so as to more fully engage the one tooth being set.

Method of operation

In using my device it is first necessary to clamp the same firmly on the table or workbench. This is accomplished by setting the device on the table, bringing the ratchet member 24 up securely against the edge after the showing of Figures 6 and 7 and then pressing downwardly on handle portions 26ᵃ of clamp 26 until foot 46 firmly engages the table, at this point pawl 27 is caused to engage ratchet 24 and the device is held securely in position. A rubber pad 55 is desirable to provide a degree of resiliency in the clamp mechanism and when used fewer teeth are required in ratchet 24. It will be apparent that the removal of the same can be very quickly done by merely pressing down on lever 26ᵃ so as to take the pressure off pawl 27 then to merely move the same upwardly so that foot 46 can be withdrawn from its contact with table T.

Assuming my device clamped in position, any one of the operations on the saw can then be undertaken. The setting of the tooth is accomplished by laying the saw S down with blade flat on table 16. The teeth are then pressed to the right, as viewed in Figures 1 and 2, until the teeth abut the members 32 and 33. The saw is then in position and the tooth to be set is placed under either face 54 of plunger 41 or under face 52 of the setting member of the form shown in Figure 2. The lever, as 21 or 21ᵃ, is then swung to the left, as shown, and pressed downwardly until the setting operation is accomplished. It will be noted that pivot 22 is raised upwardly considerably above the level of the saw table 16 and is also displaced rearwardly. This causes the setting plunger face or die, as 52 or 54, to travel through an arc of a circle and the pressing operation is a distinct wiping action which tends to press the tooth down into a more gradual curve and thus provides a distinct improvement over the older methods of pressing a plunger straight downwardly on the tooth and thus bending it sharply over the corner where the inclined plane meets the horizontal plane. This of course is a very great improvement and forward step over the older type of setting device in which the tooth was struck a sharp blow—as with the hammer striking the setting plunger.

This operation is repeated for all teeth normally struck in one direction; this will vary on different types of saws, for the usual hand saw, of course, normally alternate teeth are struck in opposite directions requiring that every other tooth be set and that then the saw be reversed and the alternate teeth not previously set be then set in the opposite sense.

To facilitate jointing a saw, I provide that a file as F be clamped in member 36 by screw 37, as after the showing of Figure 6. This provides a convenient means of jointing a saw so that all the teeth will be the same length. The convenience of this operation is assisted by providing the vertical member 38 in parallel relationship with bracket 20 so that a vertical guide is provided for the saw which can then be passed back and forth over the file using the saw handle to assist in the convenient execution of this operation.

When it is desired to file a saw my device can be used very conveniently by placing the saw with its toothed edge uppermost between members 20 and 38 and then clamping the saw in position by screw 39. When so arranged my device becomes a very convenient saw clamp which will securely hold the saw in position for filing.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

What I claim is:

1. In a saw setting device having a planiform base and an anvil mounted centrally on the upper portion of the base, a depending lug on the front edge of the base, the said lug being disposed centrally of the said front edge of the base and having a forwardly projecting arcuate portion formed with transversely extending rack teeth, a clamp lever having an intermediate angular portion straddling the lug, a pivot connecting the said angular portion of the lever with the lug so that the lever is mounted to swing in a plane perpendicular to the base, a handle portion projecting outwardly from the pivoted portion of the lever, the said lever having an arcuate portion extending inwardly beneath the base, a foot member pivotally mounted on the inner end of the said inwardly directed lever portion, a resilient pad fixed on the said foot member and cooperative with the base for gripping a support means therebetween, and a pawl pivotally mounted on the handle portion of the lever and disposed to engage the teeth of the lug for securing the said lever in adjusted support gripping position with the pad carrying foot member disposed directly beneath the anvil of the base.

2. In a saw setting device having a planiform base, a lug depending from the forward edge of the base having a forwardly projecting arcuate portion, transversely extending rack teeth formed on the said arcuate portion of the lug, a clamp lever having an intermediate angular portion straddling the said lug, a transversely extending pivot connecting the said angular portion of the lever with the lug so that the lever is disposed to swing in a plane perpendicular to the plane of the base, a handle portion projecting outwardly from the intermediate angular portion of the lever, a pivot pawl carried by the said handle portion of the lever and disposed to releasably engage the teeth of the lug, an arcuate portion extending inwardly from the intermediate angular portion of the lever beneath the base, a foot member pivotally mounted on the inner end of the said arcuate lever portion, and a pad secured on the upper face of the foot member disposed to engage the underside of a support means in cooperation with the base for clamping the device on a support.

3. In a saw setting device having a planiform base, a lug depending from the forward edge of the base having a toothed forwardly projecting arcuate portion, a clamp lever having its intermediate portion pivotally connected to the said lug so as to swing in a plane perpendicular to the base, a handle portion projecting outwardly from the pivoted portion of the lever, a pivoted pawl carried by the said handle portion of the lever and disposed to releasably engage the teeth of the lug, an arcuate portion extending inwardly from the intermediate pivoted portion of the lever and under the base, a foot member pivotally mounted on the inner end of the said arcuate lever portion, and a pad secured on the upper face of the foot member disposed to engage the underside of a support means in cooperation with the base for clamping the device on a support.

GEORGE A. VAIPAN.